Patented August 25, 1903.

UNITED STATES PATENT OFFICE.

WILLIAM J. ARMBRUSTER, OF ST. LOUIS, MISSOURI.

PROCESS OF MAKING PIGMENTS.

SPECIFICATION forming part of Letters Patent No. 737,056, dated August 25, 1903.

Application filed December 6, 1902. Serial No. 134,105. (No specimens.)

*To all whom it may concern:*

Be it known that I, WILLIAM J. ARMBRUSTER, a citizen of the United States, residing at St. Louis, State of Missouri, have invented certain new and useful Improvements in Processes of Making Pigments, of which the following is a specification.

My invention has relation to improvements in processes of making pigments; and it consists in the novel series of steps more fully set forth in the specification and pointed out in the claims.

Broadly stated, the process contemplates the precipitation, successively or simultaneously, of zinc hydrate, barium sulfate, and barium carbonate from solutions of barium and zinc and the sulfates and carbonates of the alkali metals.

As a general illustration of the process I prepare solutions of barium hydrate, zinc chlorid, sodium sulfate, and sodium carbonate. The barium hydrate and zinc chlorid are brought together, when zinc hydrate is precipitated and barium chlorid formed in solution. To the barium-chlorid solution are added the sodium-sulfate and sodium-carbonate solutions, separately or mixed together, when barium sulfate and barium carbonate are precipitated and sodium chlorid formed in solution. The solution is drained off and the precipitates washed, mixed, and dried in any well-known manner. The equation in illustration may be expressed as follows:

$$2Ba(OH)_2 + 2ZnCl_2 = 2Zn(OH)_2 + 2BaCl_2;$$
$$2BaCl_2 + Na_2SO_4 + Na_2CO_3 = BaSO_4 + BaCO_3 + 4NaCl.$$

The respective solutions can be brought together simultaneously, the equation being as follows:

$$2Ba(OH)_2 + 2ZnCl_2 + Na_2SO_4 + Na_2CO_3 = 2Zn(OH)_2 + BaSO_4 + BaCO_3 + 4NaCl.$$

The particular order of bringing the solutions together can of course be readily varied; but it should be observed in any variation not to allow reaction to take place between the sodium carbonate and the zinc solution, else the basic carbonate of zinc would thereby be precipitated.

It will readily be seen that other zinc salts, such as the acetate, nitrate, and sulfate, can be used instead of the chlorid, the acetate and nitrate having such latitude that they can be used as full equivalents for the chlorid, but when the sulfate of zinc is used the respective proportions of the solutions, as well as the order of their mixing, must be considered, owing to the great affinity of the sulfate radical for the barium base.

Suitable equivalent proportions of the respective solutions when zinc sulfate is used are as follows:

$$2Ba(OH)_2 + Na_2SO_4 + Na_2CO_3 = BaSO_4 + BaCO_3 + 4NaOH;$$
$$4NaOH + 2ZnSO_4 = 2Zn(OH)_2 + 2Na_2SO_4.$$

It will also be seen that other barium solutions can be used in addition to the barium-hydrate solution, but sufficient barium should be present in the form of hydrate to provide the hydrate radical for the zinc that is to be precipitated as hydrate. The equation following will illustrate:

$$2Ba(OH)_2 + Na_2SO_4 + Na_2CO_3 = BaSO_4 + BaCO_3 + 4NaOH;$$
$$4NaOH + 2ZnSO_4 + 2Ba(NO_3)_2 = 2BaSO_4 + 2Zn(OH)_2 + 4NaNO_3.$$

When zinc nitrate or acetate is used instead of the chlorid, more valuable by-products are produced, inasmuch as the acetate or nitrate of soda is formed in final solution instead of sodium chlorid when zinc chlorid is used, the equation in illustration being as follows:

$$2Ba(OH)_2 + 2Zn(NO_3)_2 + Na_2SO_4 + Na_2CO_3 = 2Zn(OH)_2 + BaSO_4 + BaCO_3 + 4NaNO_3.$$

When more than one kind of barium solution is used it is advisable to use a zinc salt of a nature similar to that of the additional equivalent of barium solution; otherwise the final solution would be a mixture of different compounds of the base of such solution. Thus:

$$Ba(OH)_2 + Ba(NO_3)_2 + Zn(NO_3)_2 + Na_2SO_4 + Na_2CO_3 = Zn(OH)_2 + BaSO_4 + BaCO_3 + 4NaNO_3.$$

The additional solution of barium added can even be the sulfid if the order of bringing the solutions together be observed, as follows:

$$2Ba(OH)_2 + Na_2SO_4 + Na_2CO_3 = BaSO_4 + BaCO_3 + 4NaOH;$$
$$4NaOH + 2ZnSO_4 = 2Zn(OH)_2 + 2Na_2SO_4;$$
$$2Na_2SO_4 + 2BaS = 2BaSO_4 + 2Na_2S.$$

The solution of sodium sulfid remaining should be rapidly drained off and the precipitate thoroughly washed and dried. Obviously I may substitute the sulfate and carbonate of other alkali metals for those of sodium without departing from the principle of my invention. The zinc hydrate can be coned to zinc oxid in any suitable manner,
 as calcination.
s a commercial illustration of the process
following may be cited: Separate aqueous
tions are prepared in the proportions
ified: barium hydrate three hundred and
y-two (342) pounds, zinc nitrate three
dred and seventy-eight (378) pounds, so-
n sulfate one hundred and forty-two (142)
nds, sodium carbonate one hundred and
(106) pounds, and mixed together, when
e will be precipitated one hundred and
ty-eight (198) pounds of zinc hydrate,
hundred and thirty-three (233) pounds of
um sulfate, and one hundred and ninety-
n (197) pounds of barium carbonate, and
e will be formed in solution three hun-
 and forty (340) pounds of sodium ni-
. The sodium nitrate can be readily re-
red by draining the solution from the
ipitates and evaporating it to a crystal-
condition by any suitable means. The
ipitates can be washed, freed from the
rfluous water by any suitable means, and
d. The calculations here given are based
he weights of anhydrous salts.
may of course invoke the doctrine of
nical equivalents wherever the same may
ly.
y the term "recovering" as used in the
ms I mean, of course, the recovery of the
ipitates and their subsequent intimate
ture where from their order of formation
intimate mixture may not be effected.
s would be the case where the precipita-
 was consecutive instead of simultaneous.
aving described my invention, what I
m is—

The process of making pigment which
sists in making solutions of a compound
arium, a salt of zinc, and the sulfate and
bonate of an alkali metal, and recovering
 resulting precipitates, substantially as
forth.
. The process of making pigment which
sists in mixing solutions of barium hy-
te, a salt of zinc, and the sulfate and car-
ate of an alkali metal, and recovering the
resulting precipitates, substantially as set
forth.

3. The process of making pigment which consists in mixing solutions of barium hydrate, and other soluble salts of barium, a salt of zinc, and the sulfate and carbonate of an alkali metal, and recovering the resulting precipitates, substantially as set forth.

4. The process of making pigment which consists in mixing solutions of barium hydrate, a salt of zinc, and the sulfate and carbonate of sodium, and recovering the resulting precipitates, substantially as set forth.

5. The process of making pigment which consists in mixing solutions of barium hydrate, barium nitrate, a salt of zinc, and the sulfate and carbonate of an alkali metal, and recovering the resulting precipitates, substantially as set forth.

6. The process of making pigment which consists in mixing solutions of barium hydrate, barium nitrate, a salt of zinc, and the sulfate and carbonate of sodium, and recovering the resulting precipitates, substantially as set forth.

7. The process of making pigment which consists in mixing solutions of barium hydrate, zinc nitrate, and the sulfate and carbonate of sodium, and recovering the resulting precipitates, substantially as set forth.

8. The process of making pigment which consists in mixing solutions of barium hydrate, barium nitrate, zinc nitrate, and the sulfate and carbonate of an alkali metal, and recovering the resulting precipitates, substantially as set forth.

9. The process of making pigment which consists in mixing solutions of barium hydrate, barium nitrate, zinc nitrate, and the sulfate and carbonate of sodium, and recovering the resulting precipitates, substantially as set forth.

In testimony whereof I affix my signature in presence of two witnesses.

WILLIAM J. ARMBRUSTER.

Witnesses:
EMIL STAREK,
G. L. BELFRY.